United States Patent [19]
Alberth, Jr. et al.

[11] Patent Number: 5,771,471
[45] Date of Patent: Jun. 23, 1998

[54] CHARGE REGULATOR FOR A RADIO TELEPHONE

[75] Inventors: William P. Alberth, Jr., Crystal Lake; James Kamke, Libertyville; David Mark DeMuro, Cary, all of Ill.

[73] Assignee: Motorola, Inc., Schaumburg, Ill.

[21] Appl. No.: 874,878

[22] Filed: Jun. 13, 1997

Related U.S. Application Data

[63] Continuation of Ser. No. 647,076, May 8, 1996, abandoned, which is a continuation of Ser. No. 120,509, Sep. 13, 1993, abandoned, which is a continuation-in-part of Ser. No. 83,571, May 30, 1993, abandoned.

[51] Int. Cl.⁶ .................................................. H04Q 7/32
[52] U.S. Cl. ............................ 455/573; 455/343; 363/8; 363/97
[58] Field of Search .................................. 455/572, 573, 455/343; 363/8, 97

[56] References Cited

U.S. PATENT DOCUMENTS

| | | |
|---|---|---|
| 3,602,805 | 8/1971 | Vukasovic . |
| 3,624,490 | 11/1971 | Fisher . |
| 3,652,922 | 3/1972 | Heuler et al. ................................ 323/4 |
| 4,061,956 | 12/1977 | Brown et al. ............................... 320/22 |
| 4,255,782 | 3/1981 | Joyce ........................................... 363/8 |
| 4,317,180 | 2/1982 | Lies ............................................. 364/707 |
| 4,540,929 | 9/1985 | Binkley ....................................... 320/2 |
| 4,684,870 | 8/1987 | George et al. ............................. 320/20 |
| 4,730,287 | 3/1988 | Yoshino ..................................... 368/205 |
| 4,742,411 | 5/1988 | Akerson ..................................... 363/97 |
| 4,852,147 | 7/1989 | Suzuki et al. .............................. 379/58 |
| 5,049,805 | 9/1991 | Celenza et al. ........................... 323/285 |
| 5,130,883 | 7/1992 | Edwards ..................................... 361/93 |
| 5,212,836 | 5/1993 | Matsushita ................................. 455/343 |
| 5,216,302 | 6/1993 | Tanizawa ................................... 307/603 |
| 5,237,257 | 8/1993 | Johnson et al. ............................. 320/2 |
| 5,333,176 | 7/1994 | Burke et al. ............................... 379/58 |
| 5,336,985 | 8/1994 | McKenzie .................................. 323/266 |
| 5,363,031 | 11/1994 | Miller et al. ............................... 320/21 |
| 5,367,242 | 11/1994 | Hulman ...................................... 320/2 |
| 5,396,163 | 3/1995 | Nor et al. ................................... 320/21 |
| 5,461,262 | 10/1995 | Hirasawa et al. ...................... 307/10.1 |

FOREIGN PATENT DOCUMENTS

| | | |
|---|---|---|
| 2262004 | 6/1993 | United Kingdom . |
| 2262400 | 6/1993 | United Kingdom . |
| 2262401 | 6/1993 | United Kingdom . |
| WO 91/16753 | 10/1991 | WIPO . |

OTHER PUBLICATIONS

Mazda, "Electronics Engineer's Reference Book" 44.4.

*Primary Examiner*—William Cumming
*Attorney, Agent, or Firm*—Daniel W. Juffernbruch; Rolland R. Hackbart

[57] ABSTRACT

An electronic device, such as a radiotelephone, is connectable to a variable-level power source. The electronic device includes a rechargeable power source which is repowered responsive to application of operative power generated by the variable-level power source. The electronic device provides a constant charge current regulator for converting operative power of a constant voltage into operative power of a constant current to be applied to the rechargeable power source to recharge the rechargeable power source. The constant charge current regulator is made up of a series connected diode and resistor pair. According to a further aspect of the invention, when the rechargeable power source becomes fully recharged, application of the operative power can be reduced.

14 Claims, 4 Drawing Sheets

CHARGE REGULATOR FOR A RADIO TELEPHONE

CROSS-REFERENCE TO RELATED APPLICATIONS

This is a continuation of Ser. No. 08/647,076 filed May 8, 1996, now abandoned which is a continuation of Ser. No. 08/120,509 filed Sep. 13, 1993, now abandoned which is a continuation in part of Ser. No. 08/083,571 filed May 30, 1993 now abandoned.

BACKGROUND OF THE INVENTION

The present invention relates generally to electronic devices which may be powered by rechargeable power supplies and, more particularly, to an electronic device having a rechargeable power supply, and an associated method, connectable to an external power source capable of providing operative power to recharge the rechargeable power supply of the electronic device.

Many electronic devices are constructed of designs which permit powering thereof by a battery power supply comprised of one or more battery cells. In some instances, use of a battery power supply to power the electronic device is necessitated when the electronic device is not, or cannot be, positioned proximate to a permanent, or other fixed, power supply. In other instances, a battery power supply is utilized to power the electronic device to increase the portability of the device as no power cable is required to interconnect the electronic device to the permanent, or other fixed, power supply. Typically, the one or more battery cells comprising the battery power supply utilized to power the electronic device are carried directly with, or housed within, the electronic device.

However, because a battery power supply is capable of storing only a finite amount of energy, powering of the electronic device with the battery power supply is limited by the energy storage capacity of the battery power supply. Powering of the electronic device by the battery power supply causes discharge of the stored energy of the battery power supply. Once the stored energy of the battery power supply is discharged beyond a certain level, replacement of the battery power supply is necessitated to permit continued operation of the electronic device. Increasing the energy storage capacity of a battery power supply, such as by increasing the number of battery cells comprising such power supply, increases the size (and weight) of the power supply. Such manner of increasing the energy storage capacity of a battery power supply reduces the portability of the electronic device when the battery power supply is carried with the electronic device. Accordingly, when designing a battery power supply, a compromise is made between increased energy storage capacity and reduced portability of the electronic device which carries such a battery power supply.

A portable or transportable radiotelephone is one such electronic device which is typically powered by a battery power supply. The battery power supply is typically carried directly with the radiotelephone and is of a size and weight which does not unduly constrain the portability of the radiotelephone. A radiotelephone includes radio transceiver circuitry including transmitter circuitry and receiver circuitry which is operative to transmit and to receive, respectively, modulated signals. In typical operation of a radiotelephone, receiver circuitry portions thereof are powered continuously while awaiting reception of signals indicative of an incoming call to the radiotelephone. Thereafter, the transmitter circuitry portions of the radiotelephone are also powered to permit transmission of modulated signals therefrom.

Radiotelephones operative in many cellular communication systems are constructed to transmit modulated signals therefrom and also simultaneously to receive modulated signals transmitted thereto (the modulated signals transmitted by, and to, the radiotelephone are transmitted upon separate frequency channels). Radiotelephones operative in other cellular communication systems are constructed to transmit and to receive modulated signals during nonsimultaneous time periods and, during two-way communication with the radiotelephone, the receiver and transmitter circuitry portions are powered during nonsimultaneous time periods.

Times during which the receiver circuitry portions of the radiotelephone are powered while awaiting transmission thereto of signals indicative of an incoming call shall hereinafter be referred to as times in which the radiotelephone is in the "standby" mode. (It should, of course, be noted that a user of a radiotelephone also oftentimes provides operative power to the radiotelephone only when the user desires to initiate and thereafter effectuate a telephone call; during other times no operative power is provided to the radiotelephone, and the radiotelephone is not powered to receive signals transmitted thereto. That is to say, the user of the radiotelephone may choose not to operate the radiotelephone in the "standby" mode to receive an incoming call transmitted to the radiotelephone, but rather power the radiotelephone only during times in which the user initiates a telephone call.)

Generally, the amounts of energy required to operate the transmitter circuitry portions of the radiotelephone are greater than the amounts of energy required to operate the receiver circuitry portions thereof. And, because practical devices are of less than ideal efficiencies, a certain portion of the energy applied to the radiotelephone is converted into heat energy which results in heat build-up of the radiotelephone. As more energy is required to operate the transmitter circuitry portions of the radiotelephone, there is a correspondingly greater amount of heat generation during operation of the transmitter circuitry portions of the radiotelephone than when only the receiver circuitry portions are operable.

Rechargeable battery power supplies comprised of one or more rechargeable battery cells have been developed and are commercially available. Some of such commercially-available, rechargeable battery power supplies are of constructions designed for use to power radiotelephones. The use of rechargeable battery power supplies is advantageous as the rechargeable battery cells thereof may be recharged by applying thereto a charging current generated by a power supply. Once recharged, the rechargeable battery power supply may be reused. Some constructions of rechargeable battery power supplies may be recharged, and reused, up to, and even in excess of, five hundred times.

As mentioned previously, a rechargeable battery power supply is typically comprised of one or more battery cells. The cells are connected in a series (or other) connection, and are typically housed within a common housing. The horsing, together with the battery cells, comprise the battery power supply which is also oftentimes referred to as a battery pack. For purposes of simplicity, such constructions are also generically referred to by the general term "battery". The present disclosure shall, at times, utilize such simplified terminology.

The battery cells of a rechargeable battery power supply are formed of various different materials of construction. For instance, a rechargeable battery cell may be comprised of a lithium (Li) material, a nickel-cadmium (Ni-Cd) material, or a nickel metal hydride (NiMHO$_2$) material. Battery cells constructed of these different materials exhibit different characteristics during charging thereof.

Battery charging apparatus is also commercially available to permit recharging of rechargeable battery power supplies. A battery charger comprising such battery charging apparatus is typically comprised of a power source for supplying operative power to recharge the rechargeable battery power supply when suitably connected to the charging apparatus to receive the operative power.

The energy of the operative power applied to the rechargeable battery power supply is converted into chemical energy which is stored by the rechargeable battery cells of the battery power supply. Application of the operative power to the battery cells over an elapsed period of time permits the rechargeable battery cells to become fully recharged. However, because practical devices are of less than ideal efficiencies, a certain portion of the energy applied to the battery cells are converted into heat energy which causes heat build-up of the battery cells.

Some battery charging apparatus are of construction-types which permit the electronic device and also the battery power supply both to receive operative power. Such battery charging apparatus provides operative power not only to recharge the rechargeable battery cells of the battery power supply but further provides operative power to permit operation of the electronic device.

For instance, battery charging apparatus of construction-types permitting a radiotelephone together with a rechargeable battery pack to receive operative power to recharge the battery cells of the battery pack and also to permit operation of the circuitry of the radiotelephone is available. As mentioned previously, however, in practical devices, heat is generated as a byproduct of operation of the circuitry of the radiotelephone. And, heat is also generated as a byproduct of the process of recharging the battery cells of the battery power supply.

The rechargeable battery constructions comprising the battery cells of a rechargeable battery power supply exhibit charging curves (which are plots of voltage scaled as a function of time). Over time, during recharging of such constructions of battery cells, as the amount of energy stored therein increases, the voltage levels of the battery cells of the power supply increases. Recharging of the rechargeable power supply is most efficiently accomplished when the voltage level of the power applied to the battery constructions is slightly greater (for example, approximately one Volt greater) than the voltage levels of the battery constructions. That is to say, recharging of a battery construction is most efficiently accomplished when the voltage level of the power applied to recharge the battery "tracks" the voltage level of the rechargeable battery power supply. The voltage of the power applied to the rechargeable battery power supply must be greater than the voltage levels of the rechargeable battery power supply to cause energy to be transferred to the battery power supply. However, when the voltage of the power applied to the battery power supply is significantly greater than the voltage levels of the battery power supply, a significant portion of the energy corresponding to the voltage differentials is converted into heat energy.

When the rechargeable battery power supply is embodied as a portion of an electronic device, such as a radiotelephone, the heat energy generated during application of the charging power to the rechargeable battery power supply results in heating of the electronic device. Such heating of the electronic device may cause discomfort to a user of the electronic device and also affect the performance thereof.

What is needed, therefore, is means by which charging power may be applied to a rechargeable battery embodied in an electronic device without generation of excessive amounts of heat energy.

SUMMARY OF THE INVENTION

The present invention, accordingly, provides a device, and associated method, which overcomes the problems associated with the existing art.

The present invention further advantageously provides an electronic device including a rechargeable power supply wherein the electronic device is connectable to a variable-level power source which provides operative power to recharge the rechargeable power supply and also to provide operative power to operate electronic circuitry of the electronic device.

The present invention includes further advantages and features, the details of which will become more apparent upon reading the following detailed description of the preferred embodiments.

In accordance with the present invention, therefore, an electronic device connectable to a variable-level power source is disclosed. The variable-level power source to which the electronic device is connectable has power-source control circuitry operative responsive to reception of a power-source control signal for controlling voltage levels of operative power generated by the variable-level power source. The electronic device is operable to receive the operative power of selected, constant-voltage levels generated by the variable-level power source when connected therewith. The electronic device comprises a connector which permits connection with the variable-level power source. The connector includes at least a first connector portion and a second connector portion wherein the first connector portion permits connection of the variable-level power source thereto, thereby to receive operative power generated by the variable-level power source thereat. A second connector portion permits connection of the power-source control circuitry of the variable-level power source thereto. A rechargeable power supply is coupled to receive a charging signal responsive to times in which the variable-level power source is connected to the first connector portion and the operative power is generated by the variable-level power source. Voltage sensing circuitry is operative to sense voltage levels of the rechargeable power supply and to generate a signal representative of the voltage level sensed thereby. The signal representative of the voltage levels forms the power-source control signal for application to the second connector portion of the connecting elements when characteristics of the rechargeable power supply are within selected ranges and, in turn, to the power-source control circuitry of the variable-level power source, thereby to cause the power levels of the power generated by the variable-level power source to vary responsive to the voltage levels of the rechargeable power supply. Converter circuitry is connected between the first connecting element of the connecting elements and the rechargeable power supply for converting the operative power of the selected, constant-voltage levels generated by the variable-level power source and applied to the first connector portion of the connector into operative power of selected constant-current levels. The operative power of the selected constant-current levels forms the charging signal received by the rechargeable power supply.

BRIEF DESCRIPTION OF THE DRAWINGS

The present invention will be better understood when read in light of the accompanying drawings in which.

DESCRIPTION OF THE PREFERRED EMBODIMENTS

As mentioned hereinabove, a portable electronic device is oftentimes powered by a rechargeable power supply. When the rechargeable power supply is depleted of stored energy, battery charging apparatus is utilized to recharge rechargeable battery cells of the rechargeable power supply.

Several constructions of battery charging apparatus are available which permit the portable electronic device to be positioned together with the rechargeable power supply carried therewith such that operative power is provided both to the rechargeable battery cells of the rechargeable power supply and also to the circuitry of the electronic device.

Battery charging apparatus typically includes circuitry to cause the current level of the operative power generated by the battery charging apparatus to be independent of voltage. However, because power transfer between the battery charging apparatus and the electronic device is not wholly efficient, a certain portion of the energy of the operative power generated by the battery charging apparatus is converted into heat energy which elevates the temperature of the electronic device. And, when the voltage levels of the operative power generated by the battery charging apparatus is significantly higher than the voltage levels of the battery cells of the rechargeable power supply, large portions of the operative power generated by the battery charging apparatus is converted into heat energy. As a result, the temperature of the electronic device powered by such rechargeable power supply exhibits a significant rise in temperature. In the particular instance in which the electronic device comprises a radiotelephone operative in a cellular communication system, conversion of operative power generated by the battery charging apparatus into heat energy causes an elevation of the temperature of the radiotelephone. Such elevation in the temperature of the radiotelephone can result in discomfort to the user of the radiotelephone as well as affecting performance of the radiotelephone. Also, elevation in temperature of the battery cells of the radiotelephone (or other electronic device) further can result in incomplete recharging of the battery cells, particularly if the battery charging apparatus is operative to terminate application of operative power responsive to battery cell temperatures exceeding a selected threshold.

By causing the voltage levels of the operative power generated by the battery charging apparatus to track the voltage levels of the rechargeable battery cells of the rechargeable power supply, the amount of energy of the operative power generated by the battery charging apparatus which is converted into heat energy is minimized.

When the battery charging apparatus comprises a variable-level power source, the voltage levels of the operative power generated by such power source need not be of a constant voltage level. Instead, the voltage levels of the operative power may be varied, thereby to reduce the amount of energy which is converted into heat energy during recharging of the battery cells of the rechargeable power supply.

By providing the variable-level power source comprising the battery charging apparatus with an indication of the voltage levels of the battery cells of the rechargeable power supply, the variable-level power source may be made operative to generate operative power of voltage levels which correspond to, but which are slightly greater than, the voltage levels of the battery cells of the rechargeable power supply, heat generation occurring during recharging of the battery cells may be reduced.

As also mentioned previously, the voltage levels of the battery cells of the rechargeable power supply increase as the amounts of energy stored by the battery cells increases during application of operative power thereto.

Battery cells comprised of nickel-cadmium materials are advantageously utilized as such battery cells may be recharged by applying a relatively large charging current thereto. Because a relatively large charging current may be utilized to recharge nickel-cadmium battery cells, such battery cells may be recharged in a relatively short period of time. Care must be exercised, however, when applying operative power of a relatively high charging current level to the battery cells as, once the battery cells have been fully recharged, continued application of the operative power of the relatively high charging current level causes a significant elevation of temperature of the battery cells, and damage to the battery cells.

Figure 1:
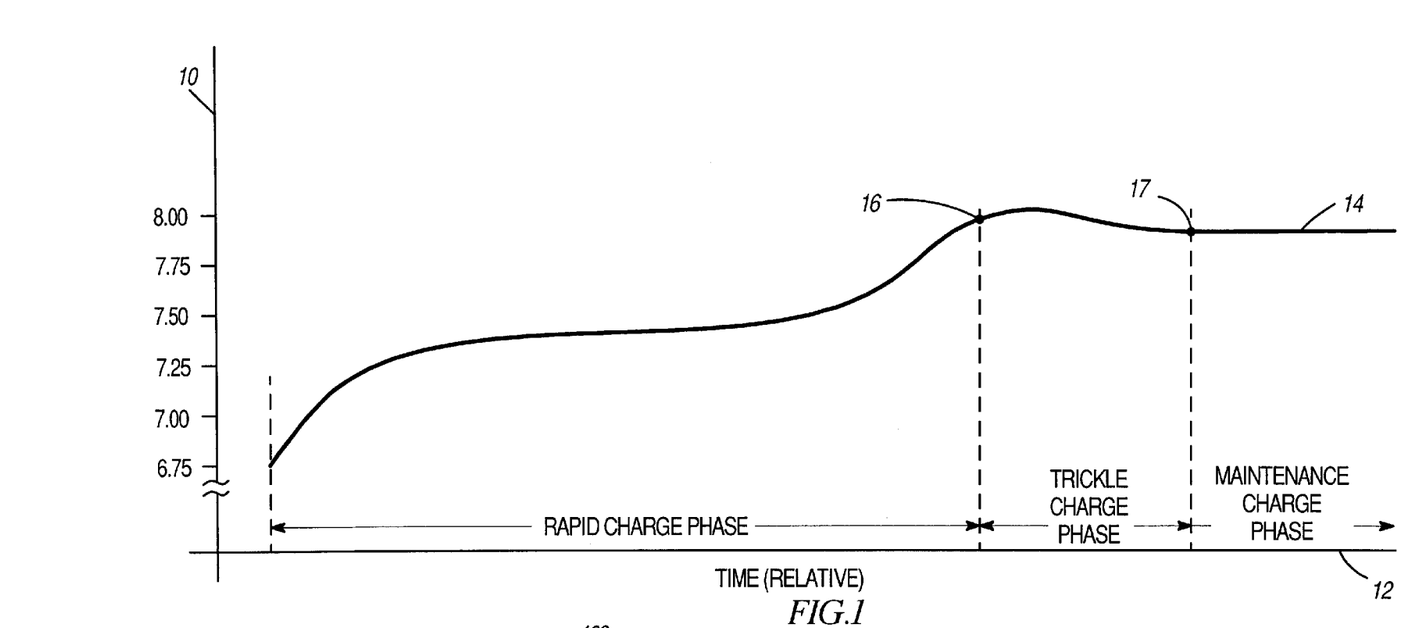
FIG. 1 is a graphical representation of a typical battery charging curve wherein voltage measured across output terminals of battery cells of a rechargeable battery pack during charging thereof is plotted as a function of time.

FIG. 1 is a graphical representation of a typical battery charging curve of a nickel-cadmium rechargeable battery cell is shown. The battery charging curve is formed of a plot of the voltage measured across output terminals of a nickel-cadmium rechargeable battery cell as a function of time.

In FIG. 1, voltage, scaled in terms of volts, is plotted along ordinate axis 10 and time, scaled in terms of seconds, is represented along abscissa axis 12. The resultant curve 14 generally increases over time responsive to the application of operative power thereto to recharge the battery cell. As illustrated, the general increase is, however, not linear. Points 16 and 17 on curve 14 are representative of voltage levels at which the current levels of the operative power applied to the battery cells of the rechargeable battery power supply are altered. Initially, and during the period of time identified in the figure by "rapid charge phase," the current levels of the operative power applied to the battery cell is of a relatively high value. Then, during the period of time identified in the figure by "trickle charge phase" (corresponding to curve 14 portions between points 16 and 17), the current levels of the operative power applied to the battery is of a first reduced value. Thereafter, during the period of time identified in the figure by "maintenance charge phase," the current levels of the operative power applied to the battery cell is of a second reduced value.

Characteristic charging curves of other types of battery constructions may be similarly shown. While such other types of battery constructions have charging curves of other characteristic shapes, the general increase in voltage as increasing amounts of energy are stored by such batteries generally holds true. In any event, by causing the variable-level power source comprising the battery charging apparatus to track the voltage of the battery cells to which operative power is applied, generation of heat energy is reduced.

Figure 2:
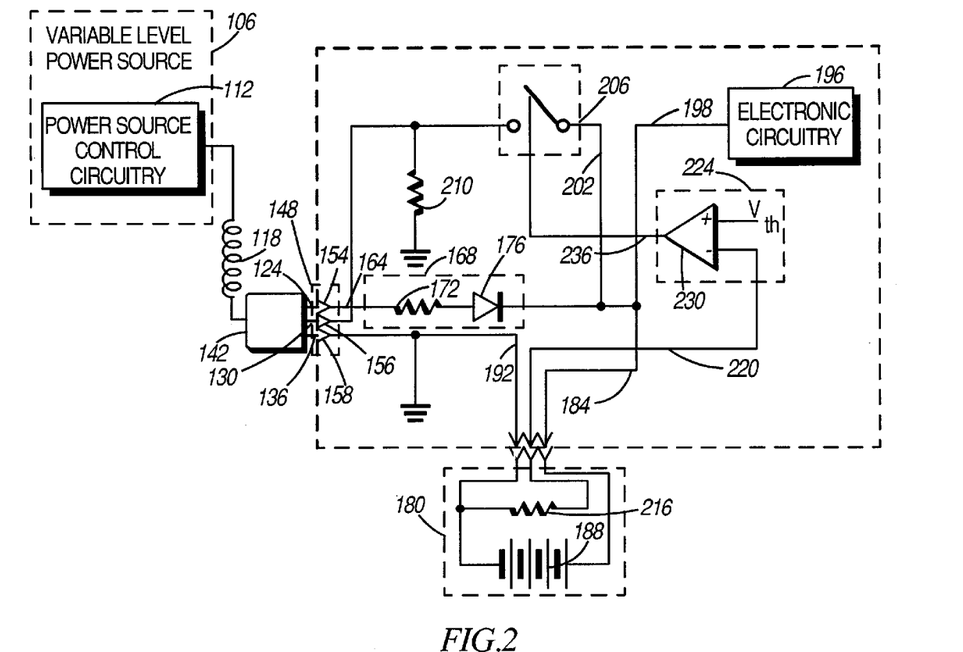
FIG. 2 is a block diagram of an electrical device of a preferred embodiment of the present invention connected to a variable-level power source.

Turning next to the block diagram of FIG. 2, an electronic device, referred to generally by reference numeral 100, of a preferred embodiment of the present invention is shown. Electronic device 100 is positioned in releasable connection with variable-level power source 106. Variable-level power source 106 includes power-source control circuitry 112 as a portion thereof. Control circuitry 112 is operative to control the voltage levels of the operative power generated by variable-level power source 106 to cause thereby the operative power generated by variable-level power source 106 to be of a constant voltage, albeit of a constant voltage of a level selected by control circuitry 112. Variable-level power source 106 is connected to electronic device 100 by way of cable 118 comprised of lines 124, 130, and 136 by way of plug member 142. Plug member 142 is releasably connectable to plug connector 148 having connecting elements 154, 156, and 158 for receiving lines 124, 130, and 136, respectively. Variable-level power supply 106 may, in turn, be connected to a conventional household power supply (by way of connection with plug connector 160) or other suitable power supply.

Variable-level power supply 106 is operative to generate operative power on line 124 of cable 118 of any of various voltage levels. The operative power generated on line 124 of the any of the various voltage levels forms a constant-voltage signal.

Line 164 of electronic device 100 is connected to connecting element 154 and is operative to supply converter circuitry 168 with the operative power received at connecting element 154.

Converter circuitry 168 is operative to convert the operative power of the constant-voltage into operative power of a constant-current and, in the preferred embodiment, is comprised of series-connected resistor 172 and diode 176. A voltage drop across resistor 172 is determined by the value of the resistance of the resistor and the voltage drop across diode 176 is determined by the physical characteristics of the diode. And, the resistance of circuitry 168 is determined by the resistance of resistor 172. Hence, the operative power at the output of converter circuitry 168 is of a constant-current level.

The operative power of the constant-current generated by converter circuitry 168 at the output thereof is supplied to rechargeable power supply 180 by way of line 184. Rechargeable power supply 180 is comprised of at least one rechargeable battery cell, here represented by battery cells 188, coupled to receive the constant-current, operative power generated at the output of converter circuitry 168. Rechargeable power supply 180 is also coupled to ground by way of line 192.

The operative power of the constant-current generated at the output of converter circuitry 168 is further provided to electronic circuitry 196 of electronic device 100 by way of line 198. The operative power generated by converter circuitry 168 is thereby operative to recharge the battery cells of rechargeable power supply 180 and also to power the electronic circuitry 196. And, when variable-level power supply 106 is not coupled to electronic device 100, energy stored by the battery cells of rechargeable power supply 180 is utilized to power the electronic circuitry 196.

Line 202 is further coupled to the output of converter circuitry 168. Line 202 is also coupled to a first side of switch circuitry 206. A second side of switch circuitry 206 is connected to connecting element 156 of plug connector 148.

When switching circuitry 206 is in a closed position, connecting element 156 is maintained at the same voltage level as the voltage level at the output of converter circuitry 168. As the output of converter circuitry 168 is coupled to battery cells 188 of rechargeable power supply 180, thereby to be of the same voltage level of the battery cells, connecting element 156 is also of the same voltage level as that of battery cells 188. When line 130 is coupled to connecting element 156, and switch circuitry 206 is in the closed position, an indication of the voltage level of battery cells 188 is provided.

When switching circuitry 206 is in the closed position and plug 142 is coupled to plug connector 148, the voltage levels of the battery cells 188 of rechargeable power supply 180 are supplied to line 130 of cable 118 of the variable-level power supply 106.

Line 130, in turn, is coupled to power-source control circuitry 112 which is operative to control the voltage levels of the operative power generated by power source 106 on line 124. The voltage levels of the operative power generated by variable-level power source 106 are thereby caused to track the voltage levels of the battery cells 188 of rechargeable power supply 180. In a preferred embodiment of the present invention, the voltage levels of the operative power generated by power source 106 are caused to be of a voltage level 1 Volt greater than the voltage level of battery cells 188 of rechargeable power supply 180 and of a minimum voltage level of 7.4 Volts and of a maximum voltage level of 10.1 Volts. Because the voltage levels of the operative power generated by power source 106 on line 124 are of voltage levels which track the voltage levels of the rechargeable battery cells 188 of rechargeable power supply 180, recharging of the battery cells 188 may be efficiently effectuated.

When switching circuitry 206 is in the open position, connecting element 156 is not coupled to the output of converter circuitry 168 but, rather, to ground by way of resistor 210.

Rechargeable power supply 180 further comprises thermistor 216 positioned proximate to the battery cells 188 of rechargeable power supply 180. Thermistor 216 is operative to generate a signal indicative of temperature levels of battery cells 188 on line 220 to temperature sensing circuitry 226.

In the preferred embodiment shown in FIG. 2, temperature sensing circuitry L is comprised of a comparator circuit including operational amplifier 230 configured in a comparator configuration to compare the sensed temperature levels represented by the signal generated by thermistor 216 and a threshold voltage. When the sensed temperature of the battery cells 188, as indicated by the signal generated by thermistor 216 on line 220, is greater than the threshold voltage, operational amplifier 230 generates a signal on line 236. The value of the signal generated on line 236 is determinative of the positioning of switching circuitry 206.

When the signal generated on line 220 by thermistor 216 is indicative of temperature levels of battery cells 188 beneath a preselected level, temperature sensing circuitry 224 causes a signal to be generated on line 236 to position switching circuitry 206 in the closed position. But, when the signal generated on line 220 by thermistor 216 is indicative of temperature levels of battery cells 188 beyond a preselected level, temperature sensing circuitry L causes a signal to be generated on line 236 to position switching circuitry 206 in the open position.

As a result of control of the positioning of switching circuitry 206 responsive to the temperature levels of the battery cells 188, application of operative power to recharge the battery cells of rechargeable power supply 180 by variable-level power supply 106 is dependent upon the temperature levels of such battery cells. As mentioned previously, the temperature levels of the battery cells during application of a charging current thereto increases at a significant rate when the battery cells become fully charged. Accordingly, a significant rate of increase in the temperature of the battery cells is indicative of complete charging of the battery cells. As switching circuitry 206 opens responsive to the signal generated on line 236 when the temperature levels of battery cells 188 are beyond the preselected level, connecting element 156 and, in turn, line 124 extending to power-source control circuitry 112 is coupled to ground when the battery cells 188 are fully charged. During such times, in the preferred embodiment, power-source control circuitry 112 causes the operative power generated by variable-level power source 106 to be of a minimum level to prevent charging of battery cells 188 at a fast charging rate, but great enough to permit operation of electronic circuitry 196 with the operative power generated by variable-level power source 106.

Figure 3:
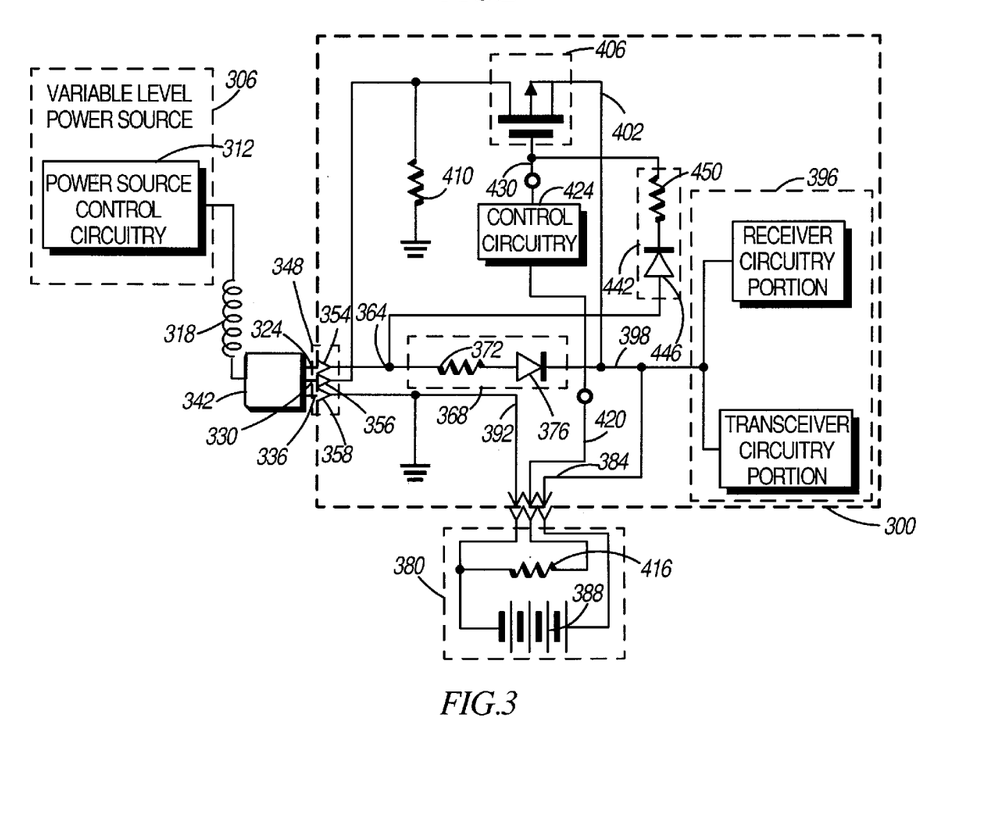
FIG. 3 is a block diagram, similar to that of FIG. 2, but of a radio transceiver of a preferred embodiment of the present invention connected to a variable-level power source.

FIG. 3 is a block diagram, similar to that of FIG. 2, but of a radio transceiver, here referred to generally by reference numeral 300 of a preferred embodiment of the present invention. Radio transceiver 300 is releasably coupled to variable-level power source 306. Variable-level power source 306 is operative to generate operative power of a constant-voltage level of any of various voltage levels. The voltage levels of the operative power generated by variable-level power source 306 is controlled by power-source control circuitry 312.

Variable-level power source 306 is releasably connectable to radio transceiver 300 by way of cable 318 having lines 324, 330 and 336 which are connectable through plug member 342 to plug connector 348 of radio transceiver 300. Plug connector 348 is comprised of connecting elements 354, 356, and 358 which receive lines 324, 330, and 336 in releasable engagement thereat.

Line 364 connects connecting element 354 of plug connector 348 to converter circuitry 368. As the operative power of the constant-voltage level is generated by variable-level power source 306 on line 324, line 364 is operative to provide such operative power to converter circuitry 368. Similar to converter circuitry 168 of electronic device 100 of FIG. 2, converter circuitry 368 is preferably comprised of a series-connected combination of a resistor and diode, here resistor 372 and diode 376. Converter circuitry 368 is operative to convert the operative power of the constant-voltage level into operative power of a constant-current level at the output of converter circuitry 368.

The operative power of the constant-current level generated by converter circuitry 368 is applied to rechargeable power supply 380 by way of line 384 to apply a charging current to battery cells 388 of the rechargeable power supply 380. Battery cells 388 are further coupled to ground by way of line 392. Thereby, when variable-level power source 306 is coupled to radio transceiver 300 to provide operative power thereto, operative power of a constant-current level may be applied to battery cells 388 of rechargeable power supply 380 to recharge the battery cells thereby.

The output of converter circuitry 368 is further coupled to radio transceiver circuitry 396, here shown to be comprised of a transmitter circuitry portion and a receiver circuitry portion by way of lines 398. Through such connection, the operative power provided to radio transceiver 300 by variable-level power source 306 may also be utilized to power radio transceiver circuitry 396 to permit operation of circuitry 396. And, as battery cells 388 of rechargeable power supply 380 are also coupled to radio transceiver circuitry 396, by way of lines 384 and 398, when variable-level power source 306 is not coupled to radio transceiver 300, energy stored by battery cells 388 may be utilized to power the circuitry 396.

Line 402 is also coupled to an output of converter circuitry 368 and is operative to interconnect converter circuitry 368 with switch circuitry 406, here shown to be comprised of a field-effect-transistor switch. Switch circuitry 406 forms either a short circuit or an open circuit depending upon the voltage levels present at the gate electrode of the transistor comprising switch circuitry 406. Switch circuitry 406 is further coupled to connecting element 354 of plug connector 348.

Accordingly, when switch circuitry 406 forms a closed circuit, the voltage level at the output of converter circuitry, and also of the battery cells 388 of rechargeable power supply 380, is applied to connecting element 330 of plug connector 348. When variable-level power source 306 is coupled to radio transceiver 300, and when transistor switch 406 forms a short circuit, the voltage levels of battery cells are provided to power-source control circuitry 312 by way of line 330 of cable 318.

In a manner analogous to operation of variable-level power source 106 and power-source control circuitry 112 of FIG. 2, the constant-voltage operative power generated by variable-level power source 306 is selected to be of a level responsive to the voltage levels of the battery cells 388 of rechargeable power supply 380. Again, in the preferred embodiment, the voltage level of the operative power generated by variable-level power source 306 is caused to be of a voltage level slightly greater than the voltage level of battery cells 388. Thereby, recharging of the battery cells 388 may be effectuated efficiently by operative power generated by variable-level power source 306.

When, conversely, the transistor comprising switch 406 forms an open circuit, connecting element 356 is coupled to ground by way of resistor 410, again to cause operation of variable-level power source 306 in a manner analogous to operation of variable-level power source 106 of FIG. 2.

Thermistor 416 is positioned proximate to battery cells 388 to determine temperature levels of the battery cells. And, as illustrated, in the preferred embodiment, thermistor 416 is located within rechargeable power supply 380. Signals generated by thermistor 416 on line 420 are indicative of the temperature levels of battery cells 388. Line 420 is coupled to processing circuitry 424 to provide the signals indicative of the temperature levels of battery cells 388 thereto. Processing circuitry 424, in a preferred embodiment, comprises a microprocessor-type device having an algorithm embodied therein operable to generate a signal on line 430 responsive to the signals applied to circuitry 424 on line 420. Line 430 is coupled to the gate electrode of transistor switch 406 to bias the gate electrode thereby. The characteristics of transistor switch 406 are thereby dependent upon the temperature levels of battery cells 388.

Analogous to operation of electronic device 100 and switching circuitry 206 which forms a portion thereof, transistor switch 406 is caused to be a short circuit when battery cells 388 are beneath a selected temperature, and to form an open circuit when battery cells 388 are beyond the selected temperature. In an alternate, preferred embodiment, processing circuitry 424 is operative to generate a signal on line 430 to cause switch 406 to form an open circuit when the rate of change of the temperature of battery cells 388 is greater than a selected value. As variable-level power source 306 tracks the voltage levels of battery cells 388 only when transistor switch 406 forms a short circuit, variable-level power source 306 provides operative power to recharge battery cells 388 only when the battery cells are of temperature levels beneath the selected temperature levels.

Radio transceiver 300 is further shown to include charge indicator circuit 442, here comprised of light emitting diode 446 and current limiting resistor 450. An anodic portion of diode 446 is coupled to line 364 by way of line 454, and a cathodic portion of diode 446 is coupled to the gate electrode of transistor switch 406 by way of current limiting resistor 450. Light emitting diode 446 is selected to be of characteristics to provide an indication of times during which operative power of voltage levels great enough to permit recharging of battery cells 388 of rechargeable battery pack 380 are generated on line 364. Hence, a visual signal generated by light emitting diode 446 is indicative of times in which a charging current is applied to battery cells 388 of rechargeable power supply 380.

Because converter circuitry 368 converts the operative power applied thereto into operative power of constant-current levels to recharge battery cells 388 at a desired current level, and because the voltage levels of the operative power generated by variable-level power source 306 track the voltage levels of battery cells 388 only when the temperature levels of the battery cells are beneath a selected temperature level, recharging of the battery cells 388 is efficiently effectuated. Also, the current level of the operative power applied to the battery cells 388 may be quickly reduced when battery cells 388 become fully recharged (as indicated by a significant elevation in the temperature levels of battery cells 388, as detected by thermistor 416).

Figure 4:
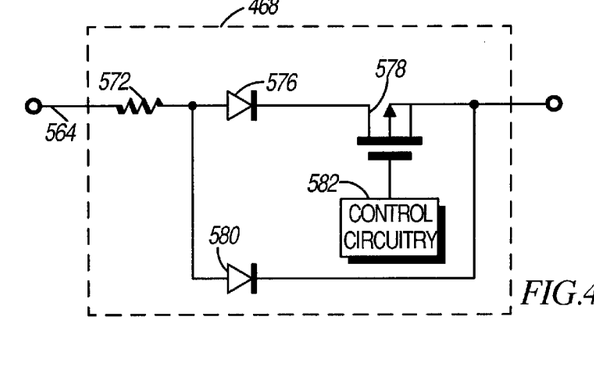
FIG. 4 is a partial block, partial circuit schematic of a portion of the radio transceiver of FIG. 3 and of the electrical device of FIG. 2 of an alternate, preferred embodiment of the present invention.

FIG. 4 is a partial block, partial circuit schematic of converter circuitry, here referred to by reference numeral 468, which may be utilized in substitution for converter circuitry 168 of electronic device 100 of FIG. 2 or in substitution for converter circuitry 368 of radio transceiver 300 of FIG. 3.

Analogous to lines 164 and 364 of FIGS. 2 and 3, respectively, line 564 is coupled to receive operative power of a constant voltage level generated by a variable-level power source. Line 564 is coupled to converter circuitry 468 to convert the operative power of the constant voltage level into operative power of a constant current level. Similar to converter circuitry 168 and 368 of the preceding figures, converter circuitry 468 is comprised of a series-connected resistor-diode combination, here resistor 572 and diode 576. The resistor-diode combination 572-576 is operative in a manner analogous to operation of the resistor-diode combinations of the converter circuitry of the preceding figures.

Converter circuitry 468 further comprises transistor switch 578, connected in series with diode 576 and second diode 580 connected in a parallel combination with the series-connected diodes 576 and transistor switch 578. The gate electrode of transistor switch 578 is coupled to control circuitry 582 which is operative to bias the gate electrode of the switch 578 to cause transistor switch 578 to be either a closed circuit or an open circuit. When transistor switch 578 forms a closed circuit, converter circuitry 468 is operative in manners identical to operation of converter circuitry 168 and 368 of the preceding figures. When, however, transistor switch 578 forms an open circuit, a separate resistor-diode combination is formed between resistor 572 and diode 580. By selecting the characteristics of diodes 576 and 580 to be different from one another, for example, by selecting diode 576 to exhibit a voltage drop of 0.3 Volts thereacross and diode 580 to exhibit a voltage drop of 1.0 Volts thereacross, the current level of the operative power generated at the output of converter circuitry 468 is caused to differ depending upon the positioning of transistor switch 578.

That is to say, when transistor switch 578 is in the closed position, the operative power generated by converter circuitry 468 at the output thereof is made selectable to be of either of two different values.

In such manner, a charging current of either of two different values may be applied to the battery cells of a rechargeable power supply.

[More particularly, in a preferred embodiment of the present invention, when transistor switch 578 forms a closed circuit, a fast charging current (i.e., operative power of a relatively high current level) is applied to the battery cells of a rechargeable power supply, and, when transistor switch 578 forms an open circuit, a trickle charging current (i.e., operative power of a low current level) is applied to the battery cells of the rechargeable power supply.]

Utilization of converter circuitry 468 is particularly advantageous when the rechargeable battery cells are comprised of a nickel metal hydride material. Once a battery cell comprised of the nickel metal hydride material becomes fully charged, operative power applied to the battery cells must be of a low current level (relative to the current level which may be applied to a battery cell comprised of a nickel cadmium material). By proper selection of the characteristics of diode 580, the operative power at the output of converter circuitry 468 may be caused to be of a desired, low current level when switch 578 is open.

Also, diode 580 may be selected to be of characteristics to cause the operative power at the output of circuitry 468 to be of a current level to permit powering of electronic circuitry, such as circuitry 196 or 396 of FIGS. 2 and 3, respectively, irrespective of the presence of a rechargeable power supply.

And, resistor 572 and diodes 576 and 580 may be selected to be of characteristics, and switch 578 and 406 (or 206 in FIG. 2) may be caused to be operative to open and close in a manner to cause the operative power to be of a first current level (e.g., a high current level) when both switches are closed, a second current level (e.g., a low current level) when only switch 578 is closed, and a third current level (e.g., a very low current level) when both switches are open.

Figure 5:
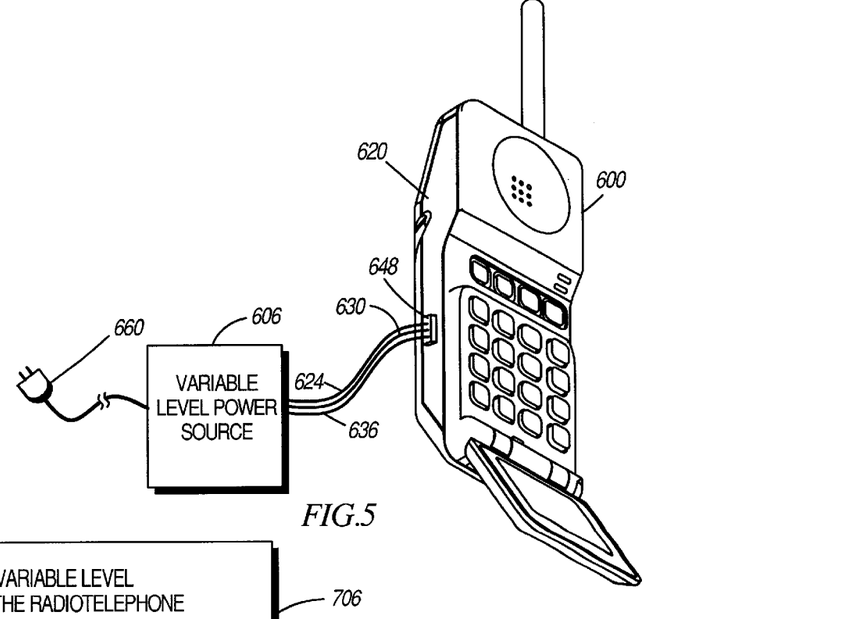
FIG. 5 is a schematic representation of a cellular radiotelephone, similar to the radio transceiver shown in block form in FIG. 3 of a preferred embodiment of the present invention.

Turning next to the schematic view of FIG. 5, a radiotelephone, referred to generally by reference numeral 600, is shown. Radiotelephone 600 corresponds to radiotelephone 300 shown in the block diagram of FIG. 3. Elements of radiotelephone 300 shown in block form in FIG. 3 are disposed within the housing of radiotelephone 600 of FIG. 5 but for rechargeable battery power supply 380 which here is shown to comprise battery pack 620.

Radiotelephone 600 is connected to variable-level power source 606 by way of lines 624, 630, and 636 which connect power source 606 to connecting elements of radiotelephone 600 through plug connector 648. (Connecting elements of radiotelephone 600 are hidden from view in the figure, but correspond to connecting elements 354, 356, and 358 of FIG. 3.) Plug connector 660 is also shown in the figure permitting connection of power source 606 to a conventional household power supply. (While plug connector 660 comprises a plug connector permitting connection to a conventional household power supply, other plug connectors permitting connection to other types of power supplies are, of course, similarly possible.)

Because power source 606 is positioned remote from radiotelephone 600, but connected thereto by way of lines 624, 630, and 636, radiotelephone 600 may be conveniently operated by a user in spite of the connection between radiotelephone 600 and power source 606. Because the voltage levels of the operative power generated by power source 606 tracks the voltage levels of the battery pack, recharging of the battery cells of the battery pack is efficiently accomplished without conversion of excessive amounts of energy into heat energy.

Figure 6:
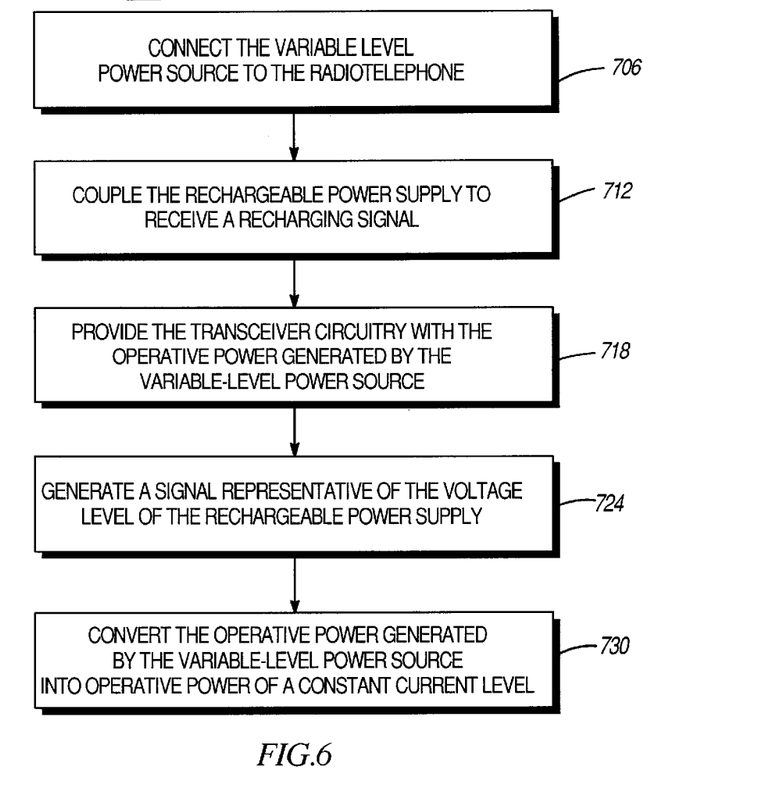
FIG. 6 is a flow diagram listing the method steps of the method of a preferred embodiment of the present invention.

Turning next to the logical flow diagram of FIG. 6, the method steps of the method, referred to generally by reference numeral 700, of a preferred embodiment of the present invention are shown. The method provides operative power of selected constant-voltage levels generated by a variable-level power source having power-source control circuitry operative responsive to reception of a power-source control signal to a radiotelephone having transceiver circuitry when the variable-level power source is connected to the radiotelephone.

First, and as indicated by block 706, the variable-level power source is connected to the radiotelephone. And as indicated by block 712, a rechargeable power supply is coupled to receive a charging signal responsive to times in which the variable-level power source is coupled to provide operative power to the radiotelephone.

Then, as indicated by block 718, the transceiver circuitry is provided with either the operative power generated by the variable-level power source or the power generated by the energy stored by the rechargeable power supply.

Then, as indicated by block 724, a signal representative of the voltage levels of the rechargeable power supply is generated wherein the signal representative of the voltage levels forms the power-source control signal for application to the variable-level power source. In turn, the power-source control signal is applied to the power-source control circuitry of the variable-level power source, thereby to cause the selected voltage levels of the power generated by the variable-level power source to vary responsive to the voltage levels of the rechargeable power supply.

Finally, and as indicated by block 730, the operative power of the selected, constant-voltage levels generated by the variable-level power source and applied to the radiotelephone is converted into operative power of selected constant-current levels, wherein the operative power of the selected constant-current levels forms the charging signal received by the rechargeable power supply.

Figure 7:
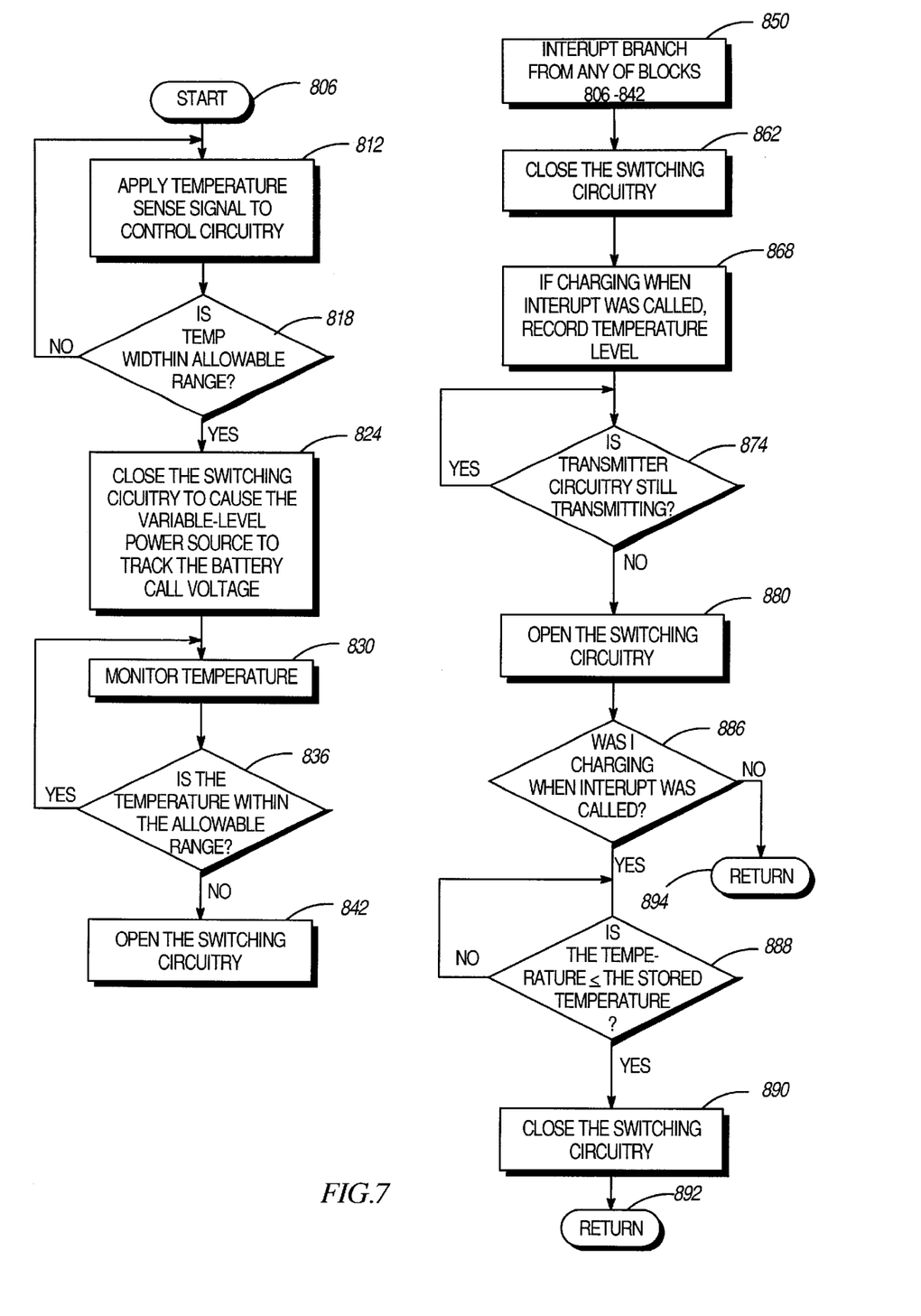
FIG. 7 is a flow diagram listing the method steps of an algorithm executable by control circuitry which forms a portion of the radio transceiver of a preferred embodiment of FIG. 3.

Turning finally to the flow diagram of FIG. 7, the method steps of an algorithm executable by control circuitry which forms a portion of the radio transceiver 300 of FIG. 3 is shown.

First, after entry into the program, as indicated by start block 806, a temperature-sense signal indicative of temperature levels of the battery cells of a rechargeable power supply is applied to control circuitry, as indicated by block 812.

Next, and as indicated by decision block 818, a determination is made as to whether the sensed temperature level is within a desired temperature range. If the temperature level is beyond the desired range, the no branch is taken to block 812 and the process is repeated. If the temperature level is within the desired range, the yes branch is taken to block 824 whereat the transmitter switch is closed and operative power of a voltage level which tracks the voltage level of the battery cells of the rechargeable power supply is applied to the radiotelephone by the variable-level power source 306.

Then, and as indicated by block 830, the temperature-sense signal indicative of temperature levels of the battery cells of the rechargeable power supply applied to the control circuitry is again monitored.

Next, and as indicated by block 836, a determination is made as to whether the sensed temperature level is still within the desired temperature range. If so, the yes branch is taken to block 830, and the process is repeated. Otherwise, the no branch is taken to block 842 whereat the switch is opened, and the operative power applied to the battery cells of the rechargeable power supply no longer track the voltage levels of the battery cells.

An interrupt branch, identified by reference numeral 850, is further shown in the Figure. The interrupt branch is executed whenever the radiotelephone activates the transmitter circuitry of block 396 in FIG. 3. The interrupt branch can be called at any time during the execution of blocks 806 to 842.

Then, as indicated by block 862, switch 206 is closed, applying operative power of a voltage level which tracks the voltage level of the battery cells of the rechargable power supply is applied to the radiotelephone by the variable-level power source 306.

Next, as indicated by block 868, the temperature of the rechargable power supply is stored in memory if the radiotelephone was in process of recharging the rechargable power supply. That is, if switch 206 was closed when the Interrupt branch was called, then store the temperature of the rechargable power supply.

A decision is made, as indicated by block 874, as to whether or not the transmitter circuitry of the radiotelephone is still enabled. If the transmitter circuitry is still enabled then the yes branch is taken, and block 874 is executed again. If the transmitter circuitry is no longer enabled, then the no branch is taken, and switch 206 is opened as indicated in block 880.

A decision is made, as indicated in block 886, as to whether or not switch 206 was closed when the interrupt branch was called. That is, if the radiotelephone was in process of recharging the rechargable power supply when the interrupt branch was executed then the yes branch is taken. If the radiotelephone was not in process of recharging the rechargable power supply then the no branch is taken to block 894 and software returns from the interrupt branch. If the yes branch is taken, then a decision is made, as indicated by block 888, as to whether or not the temperature of the rechargable power supply is equivalent to the temperature stored during block 868. If the temperature of the rechargable power supply is greater then the temperature stored during block 868, then the no branch is taken. If the temperature of the rechargable power supply is equal to or less then the temperature stored during block 868, then the yes branch is taken to block 890.

Next, and as indicated in block 890, switch 206 is closed, again applying operative power of a voltage level which tracks the voltage level of the battery cells of the rechargable power supply from the variable-level pwoer source 306.

Then, and as indicated in block 892, software flow returns from the interrupt branch.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A portable electronic device for performing a primary function and for performing a secondary function, the secondary function being support of rechargeable operation using an external voltage supply for supplying a variable voltage to the portable electronic device in response to a power-source voltage control signal, the portable electronic device comprising:

a connector for connecting the variable voltage from the external voltage supply to the portable electronic device via a first connecting element and for connecting the power-source voltage control signal from the portable electronic device to the external voltage supply via a second connecting element;

a charging circuit operatively coupled to the first connecting element to receive the variable voltage from the external voltage supply and provide a charging current therefrom;

at least one rechargeable cell operatively coupled to the charging circuit to receive the charging current;

a tracking voltage sensing connection operatively coupled between the rechargeable cell and the second connecting element for sensing voltage levels of the rechargeable cell to provide the power-source voltage control signal to the external voltage supply which tracks a voltage level of the rechargeable cell;

a controller circuit for generating a charge control signal based on a charging status;

a power control circuit operatively coupled to the rechargable cell, the control circuit and the second connecting element for connecting the power-source voltage control signal from the tracking voltage sensing connection to the external voltage supply via the second connecting element based on the charge enable control from the threshold comparitor; and electronic circuitry for performing the primary function of the portable electronic device and operatively coupled to the rechargeable cell to receive power from the rechargeable cell when the external voltage supply is not present during portable operation and operatively coupled to the external voltage supply to receive power from the external voltage when the external voltage supply is present regardless of whether the rechargeable cell is present.

2. A portable electronic device according to claim 1, wherein the charging circuit comprises a constant charge current regulator operatively coupled to the first connecting element and the rechargeable cell and consisting essentially of a pair of a series connected resistor and diode of a selected characteristic impedance of a value sufficient to cause a selected voltage drop across the pair and convert the variable voltage from the external voltage supply into the charging current to charge the rechargeable cell.

3. A portable electronic device according to claim 1, wherein the portable electronic device further comprises a transceiver and wherein the electronic circuitry comprises portions of the transceiver.

4. A portable electronic device according to claim 1, further comprising a temperature sensing circuit for sensing temperature levels of the rechargeable cell.

5. A portable electronic device according to claim 4, wherein the temperature sensing circuit comprises a thermistor positioned within the at least one rechargeable cell and a temperature threshold sensing circuit coupled to the thermistor wherein the temperature sensing circuit is operative to generate a temperature-sense signal of at least a first selected value when the thermistor indicates the rechargeable cell to be beyond a selected temperature level.

6. A portable electronic device according to claim 5, wherein the temperature-sense signal generated by the temperature threshold sensing circuit is applied to the power control switch to connect the power-source voltage control signal to the second connecting element responsive to values of the temperature-sense signal.

7. A portable electronic device according to claim 6, wherein the power control switch comprises a transistor circuit and wherein the temperature-sense signal generated by the temperature sensing circuit and applied to the power control switch is coupled to the transistor circuit to bias the transistor circuit thereby.

8. A portable electronic device according to claim 1, further comprising indicating circuitry for indicating times during which operative power of power levels at least as great as a selected power level is applied to the first connecting element of the connector.

9. A portable electronic device according to claim 1, further comprising device control circuitry for variably generating the threshold used by the threshold comparitor.

10. A portable electronic device according to claim 1, wherein the portable electronic device is a radiotelephone and the electronic circuitry comprises at least portions of a radiotelephone.

11. A radiotelephone for transmitting and receiving a radio signal and for performing a recharging control function using an external voltage supply, the external voltage supply for supplying a variable voltage to the portable electronic device in response to a power-source voltage control signal, the radiotelephone comprising:

a connector for connecting the variable voltage from the external voltage supply to the radiotelephone via a first connecting element and for connecting the power-source voltage control signal from the radiotelephone to the external voltage supply via a second connecting element;

a charging circuit operatively coupled to the first connecting element to receive the variable voltage from the external voltage supply and provide a charging current therefrom;

at least one rechargeable cell operatively coupled to the charging circuit to receive the charging current;

a tracking voltage sensing connection operatively coupled between the rechargeable cell and the second connecting element for sensing voltage levels of the rechargeable cell to provide the power-source voltage control signal to the external voltage supply which tracks a voltage level of the rechargeable cell;

a controller circuit for generating a charge control signal based on a charging status;

a power control circuit operatively coupled to the rechargeable cell, the control circuit and the second connecting element for connecting the power-source voltage control signal from the tracking voltage sensing connection to the external voltage supply via the second connecting element based on the charge enable control from the threshold comparitor; and transmitter circuitry and receiver circuitry for transmitting and receiving a radio signal and operatively coupled to the rechargeable cell to receive power from the rechargeable cell when the external voltage supply is not present during portable operation and operatively coupled to the external voltage supply to receive power from the external voltage supply when the external voltage supply is present regardless of whether the rechargeable cell is present.

12. A portable electronic device for performing a primary function and for performing a secondary function, the secondary function being support of rechargeable operation using an external voltage supply for supplying a variable voltage to the portable electronic device in response to a power-source voltage control signal, the portable electronic device comprising:

a connector for connecting the variable voltage from the external voltage supply to the portable electronic device via a first connecting element and for connecting the power-source voltage control signal from the portable electronic device to the external voltage supply via a second connecting element;

a charging circuit operatively coupled to the first connecting element to receive the variable voltage from the external voltage supply and provide a charging current therefrom;

at least one rechargeable cell operatively coupled to the charging circuit to receive the charging current;

a tracking voltage sensing connection operatively coupled between the rechargeable cell and the second connecting element for sensing voltage levels of the rechargeable cell to provide the power-source voltage control signal to the external voltage supply which tracks a voltage level of the rechargeable cell;

a controller circuit for generating a charge control signal based on a charging status;

a power control circuit operatively coupled between the rechargeable cell, the controller circuit and the first connecting element to control the charge rate based on the charge control signal from the threshold comparitor; and electronic circuitry for performing the primary function of the portable electronic device and operatively coupled to the rechargeable cell to receive power from the rechargeable cell when the external voltage supply is not present during portable operation and operatively coupled to the external voltage supply to receive power from the external voltage when the external voltage supply is present regardless of whether the rechargeable cell is present.

13. A portable electronic device according to claim 12, wherein the charging circuit comprises a diode operatively coupled in series between the first connecting element and the rechargeable cell.

14. A portable electronic device according to claim 12 wherein the portable electronic device further comprises a transceiver and wherein the electronic circuitry comprises portions of the transceiver.

* * * * *